United States Patent [19]

Carpenter et al.

[11] Patent Number: 5,001,190

[45] Date of Patent: Mar. 19, 1991

[54] PROCESS FOR FILLING SPACE IN A STRUCTURE WITH A POLYURETHANE COMPOSITE IN THE PRESENCE OF WATER

[75] Inventors: William G. Carpenter, Powell; Colleen M. Henry, Worthington, both of Ohio

[73] Assignee: Ashland Oil, Inc., Russell, Ky.

[21] Appl. No.: 308,351

[22] Filed: Feb. 8, 1989

Related U.S. Application Data

[63] Continuation-in-part of Ser. No. 169,710, Mar. 18, 1988, abandoned, which is a continuation-in-part of Ser. No. 923,920, Oct. 28, 1986, abandoned.

[51] Int. Cl.$^5$ ............................................. C08L 75/04
[52] U.S. Cl. .................................. 524/871; 524/590; 427/136; 427/140
[58] Field of Search ................. 524/590, 871; 427/136, 427/140, 385.5; 428/63

[56] References Cited

U.S. PATENT DOCUMENTS

| | | | |
|---|---|---|---|
| 3,409,579 | 11/1968 | Robins | 524/381 |
| 4,021,401 | 5/1977 | Jeppsen | 524/871 |
| 4,139,676 | 2/1979 | Janssen et al. | 427/136 |

OTHER PUBLICATIONS

Buist et al.: Advances in Polyurethane Technology; MaClaren & Sons, Ltd.; 1968; 274–276.

Primary Examiner—Lewis T. Jacobs
Attorney, Agent, or Firm—David L. Hedden

[57] ABSTRACT

The invention relates to a process for filling space in a structure with a polyurethane composite in the presence of water which comprises adding a coarse aggregate and certain polyurethane binders to the space of the structure to be filled. The process is particularly useful for filling space in roads, runways, and other structures made of asphalt, concrete, or similar building materials.

11 Claims, No Drawings

PROCESS FOR FILLING SPACE IN A STRUCTURE WITH A POLYURETHANE COMPOSITE IN THE PRESENCE OF WATER

This application is a continuation-in-part of application Serial No. 169,710 filed on Mar. 18, 1988 which is a continuation-in-part of Ser. No. 923,920 filed on Oct. 28, 1986, both now abandoned.

TECHNICAL FIELD

The invention relates to a process for filling a space in a structure in the presence of water with coarse aggregate and certain polyurethane binders. The process is particularly useful for filling space in roads, runways and other structures made of asphalt, concrete, cement and other such building materials.

BACKGROUND OF THE INVENTION

It is known that composites can be used for repairing roads, runways and other structures made from asphalt, concrete, cement and similar building materials. Generally composites consist of an aggregate and a polymeric binder.

The physical characteristics of such composites must be sufficient to support the load to which the composite will be subjected. For instance, an adequate compression strength of at least 2,000 psi and an adequate flexural strength of at least 400 psi is required. The composite must also be resistant to shrinkage and be compatible with materials such as asphalt, concrete, cement, and the like.

In addition to these requirements, the materials used in the composite must be acceptable from a safety and toxicological viewpoint. In particular they must not have dangerously low flashpoints. The materials must also be easy to handle and mix and have an adequate shelf life.

It is also preferred that the worktime of such composites can be varied depending upon the use, but that the composites cure rapidly (within 60 seconds) after the worktime has elapsed. The composites preferably should also be effective at both lower temperatures (such as $-6°$ C.) and higher temperatures (such as $35°$ C.).

Such composites are known in the art. See for instance U.S. Pat. No. 4,021,401 wherein a polyurethane binder and coarse aggregate are used to form the composite.

Not addressed in this patent, however, is the formation of composites in the presence of water. The formation of composites in the presence of water is often required because rain, snow, or other sources of moisture may cause the space to be filled with aggregate and/or binder to become wet. This is a particular problem where repairing runways for military or commercial aircraft during wet weather conditions.

This problem and a solution to it are not addressed in the prior art to the inventors' knowledge.

SUMMARY OF INVENTION

The subject invention relates to a process for filling a space in a structure with a polyurethane composite in the presence of water which comprises (a) adding a coarse aggregate to the space in said structure to be filled, and (b) adding a polyurethane binder to said aggregate wherein said binder comprises a mixture of (i) a phenolic resin component, which is denser than water, comprising
  1. a resole phenolic resin, and
  2. a hydrophobic solvent system in which water is not significantly soluble;
(ii) an isocyanate component which is denser than water comprising
  1. an aromatic polyisocyanate selected from the group consisting of diphenylmethane diisocyanates, oligomeric derivatives of diphenylmethane diisocyanates, and mixtures thereof, and
  2. a hydrophobic solvent in which water is not significantly soluble; and
(iii) a urethane promoting catalyst;

wherein the amounts of said components are as follows:

(a) the weight ratio of the binder to the aggregate is from about 8:92 to about 50:50;

(b) the ratio of hydroxyl groups in the phenolic resin to isocyanate groups of the isocyanate component is from about 0.8:1 to about 1.2:1 and (c) the urethane catalyst is used in an amount such that the binder is essentially non foaming and the composite is capable of being formed with wet aggregate;

wherein said process is carried out under conditions such that water is present in the amount of at least one percent by weight based upon the weight of said aggregate.

The process is useful for filling spaces in roads, runways and other structures made of asphalt, concrete, cement, and other such building materials. The polyurethane binder can be percolated through the wet, coarse aggregate which has been added to a space in a road, runway, or other structure made of asphalt, concrete, cement, or other such building materials.

This process results in composites having satisfactory physical characteristics, resistance to excessive shrinkage, which will satisfy reasonable safety specifications, which are easy to mix, and have adequate shelf lives. In addition to this they work effectively at rather varying temperatures (such as $-6°$ C. and $35°$ C.) if the catalyst amount is satisfactorily adjusted.

The composite can be formed without causing detrimental foaming, which is surprising, since the reaction between a polyisocyanate and hydroxyl-containing compound is known to generate foam in this presence of moisture.

BEST AND VARIOUS MODES FOR CARRYING OUT THE INVENTION

For purposes of this invention the term "space to be filled in the structure" includes space occupied by water since the water will be displaced by the aggregate and binder. The process takes place in the presence of water if there is at least one percent by weight of water, based upon the weight of the course aggregate. The water may be present in the space to be filled, the coarse aggregate and/or the polyurethane binder. The process takes place in the presence of excessive water if more than five percent by weight of water is present based upon the weight of the aggregate.

The coarse aggregates used in the subject process are such as those defined in ASTM D448-80 (1983). This standard specifies various standard sizes of coarse aggregate used as paving materials. Other commonly known coarse aggregates such as pea gravel and TUF-CHEM grout made by Pennwalt Corporation may be used. The coarse aggregate may also contain some fine aggregate such as sand, quartz, zircon, olivine, aluminosilicate, chromite, and the like. The total volume of the aggregate, however, is predominately (more than 50%) related to the coarse aggregate.

The polyurethane binder system used to make the polyurethane binder that is used with the aggregate is comprised of three components: (a) the phenolic resin component, (b) the isocyanate component, and (c) the catalyst.

The phenolic resin component is comprised of (a) a resole phenolic resin, and (b) a hydrophobic solvent system which preferably is one in which water is not soluble in any significant amounts.

Resole phenolic resins are well known and are generally prepared by reacting a phenolic material with a molar excess of formaldehyde in the presence of an alkaline catalyst or a metal ion catalyst The preferred phenolic resins used to form the subject binder compositions are well known in the art, and are specifically described in U.S. Pat. No. 3,485,797 which is hereby incorporated by reference.

These resins are the reaction products of an aldehyde with a phenol They contain a preponderance of bridges joining the phenolic nuclei of the polymer which are ortho-ortho benzylic ether bridges They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium.

The phenols may be represented by the following structural formula:

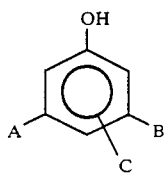

wherein A, B, and C are hydrogen atoms, or hydroxyl radicals, or hydrocarbon radicals or oxyhydrocarbon radicals, or halogen atoms, or combinations of these.

The phenol may be a multiple ring phenol such as bisphenol A. The phenolic resin is preferably non-aqueous. By "non-aqueous" is meant a phenolic resin which contains water in amounts of no more than about 10%, preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms.

By "phenolic resin" is meant the reaction product of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents, and/or other ingredients present, and so forth). The reaction products, that is the phenolic resin, will be a mixture of different molecules and may contain in widely varying ratios addition products, condensation products, and unreacted reactants such as unreacted phenol and/or unreacted aldehyde.

By "addition product" is meant reaction products in which an organic group has been substituted for at least one hydrogen of a previously unreacted phenol or of a condensation product.

By "condensation product" is meant reaction products that link two or more aromatic rings.

The phenolic resins are substantially free of water and are organic solvent soluble. The phenolic component includes any one or more of the phenols which have heretofore been employed in the formation of phenolic resins and which are not substituted at either the two ortho-positions or at one ortho-position and the para-position, such unsubstituted positions being necessary for the polymerization reaction Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable.

The phenol reactant is preferably reacted with an aldehyde to form phenolic resins and more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

Alkoxy-modified phenolic resins may also be used as the phenolic resin. These phenolic resins are prepared in essentially the same way as the unmodified phenolic resins previously described except a lower alkyl alcohol is reacted with the phenol and aldehyde or reacted with an unmodified phenolic resin.

The phenolic resin used must be liquid or organic solvent soluble. Solubility in an organic solvent is desirable to achieve uniform distribution of the binder on the aggregate.

The substantial absence of water in the phenolic resin is desirable in view of the reactivity of the binder composition of the present invention with water. Mixtures of phenolic resins can be used.

The solvent system for the phenolic resin component is a hydrophobic solvent, preferably in which water is not significantly soluble. For many applications it is also desirable to use solvents with high flashpoints such as at least 50° C. Suitable solvents can be determined by looking at physical data sheets on various solvents Generally, the solvent will be from 40 to 60 weight percent of the phenolic resin component. The viscosity of the phenolic resin component is generally less than 500 cps and preferably less than 100 cps, which allows for easy mixing with the isocyanate component. The viscosity of the resin component can be adjusted by varying the amount of solvent.

In addition, the solvent component can include liquid dialkyl esters such as dialkyl phthalate of the type disclosed in U.S. Pat. No. 3,905,934. Such compounds preferably have the structure:

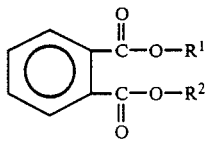

where $R^1$ and $R^2$ are alkyl radicals of 1 to 12 carbon atoms and the total number of carbon atoms in the R groups does not exceed 16. More usually $R^1$ and $R^2$ are alkyl radicals of 3 to 6 carbon atoms and the total number of carbon atoms in $R^1$ and $R^2$ is between 6 and 12. Thus, in the above structural formula either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

Other dialkyl esters include dimethyl glutarate such as available from Du Pont under the trade designation DBE-5; dimethyl adipate, available from Du Pont under the trade designation DBE-6; dimethyl succinate; and mixtures of such esters which are available from Du Pont under the trade designation DBE, and dialkyl adipates and succinates with alcohols up to 12 carbon atoms.

In a preferred mode for practicing the invention (particularly where the binder is percolated into the aggregate), a chain extender or crosslinking compound is also added to the phenolic resin component. Such compounds are low molecular weight diols or triols having a molecular weight of approximately 40-200. These compounds should be soluble in the solvent system. Examples of such compounds are propylene glycol, ethylene glycol, diethylene glycol, glycerine and the like. These compounds are useful in formulating a phenolic resin component which is approximately equal in volume to the isocyanate component which makes field use easier. The chain extenders and crosslinking compounds also have been found to improve the compression strength of the finished composite.

The isocyanate component of the polyurethane binder comprises certain aromatic polyisocyanates and a hydrophobic solvent system, preferably in which water is not significantly soluble Aromatic polyisocyanates which are used are those selected from the group consisting of diphenylmethane diisocyanates, oligomers of diphenylmethane diisocyanates, and mixtures thereof. Specific examples of such aromatic polyisocyanates are 2,2'-, 2,4'- or 4,4'-diphenylmethane diisocyanate; 3,3'-dimethyl2,2'-, 2,4'- or 4,4'-diphenylmethane diisocyanate; polyphenyl polymethylene polyisocyanate, or mixtures of any of the aforementioned isocyanates. Aromatic polyisocyanates particularly preferred are the mixture of diphenylmethane diisocyanate isomers with polyphenyl polymethylene polyisocyanates ("crude MDI"). Such polyisocyanates are sold under the trademarks PAPI (Dow Chemical Company) and MONDUR (Mobay Chemical Company).

The polyisocyanates are used in sufficient concentrations to cause the curing of the phenolic resin when reacted with the curing catalyst In general the ratio of hydroxyl groups of the phenolic resin to the isocyanato groups of the polyisocyanate is from 0.8:1 to 1.2:1, preferably about 1:1.

The polyisocyanate is used in a liquid form Solid or viscous polyisocyanate must be used in the form of organic solvent solutions, the solvent generally being present in a range of up to 80% by weight of the solution.

The solvents used with the isocyanate component must satisfy the requirements of those used with the phenolic resin component. They must be hydrophobic and preferably are solvents in which water is not soluble in any significant amount. They also should preferably have flashpoints of at least 50° C.

The solvent systems used in the phenolic resin component and the isocyanate must be compatible with each other. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins It is therefore preferred to employ combinations of solvents and particularly combinations of aromatic and polar solvents Suitable aromatic solvents are benzene, toluene, xylene, ethylbenzene, and mixtures thereof Preferred aromatic solvents are mixed solvents that have an aromatic content of at least 90% and a boiling point range within a range of 138° C. to 232° C. The polar solvents should not be extremely polar such as to become incompatible with the aromatic solvent Suitable polar solvents are generally those which have been classified in the art as coupling solvents and include furfural, furfuryl alcohol, Cellosolve acetate, butyl Cellosolve, butyl Carbitol, diacetone alcohol and "Texanol".

A preferred embodiment of the invention also requires that the phenolic resin component and isocyanate component be formulated such that their density is greater than water. This is important where the composites are to be formed in aqueous conditions. In such cases it is important for the phenolic resin component and isocyanate component to sink below the water where they can react without significant foaming. A particular solvent system which satisfies the requirements of this invention consists of a combination of an aromatic solvent such as HI-SOL 10 or HI-SOL 15 sold by Ashland Chemical Company with butyl cellosolve acetate, a polar solvent.

The catalysts used in the polyurethane-forming binder system are liquid urethane promoting catalysts such as tertiary amines, metal salts, or mixtures thereof Examples of such suitable catalylic compounds are triethylamine, dimethylaminoethanol, N,N,N',N'-tetraethylethylenediamine, N,N,N',N'-tetramethyl-1,3-butanediamine, bis(dimethylaminoethyl)ether, N,N-dimethyl-3-dimethylaminopropionamide, 1,4-diazo(2.2.2)bicyclooctane, N-methyl- or ethylmorpholine, stannous oleate, stannous 2-ethylhexanoate, dibutyltin dilaurate, dibutyltin dilauryl mercaptide, dibutyltin diacetate, lead naphthenate, zinc stearate, or mixtures thereof.

Preferably used as the urethane promoting catalyst is a base having a $pK_b$ value in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, 4,4-dipyridine, phenylpropyl pyridine, 1-methylbenzimidazole, and 1,4-thiazine.

The urethane catalyst is used in an amount such that the binder is essentially non-foaming when used with wet, coarse aggregate. In view of the varying catalytic activity and varying catalytic effect desired, specific catalyst concentrations will vary. In general the lower the $pK_b$ value is, the shorter will be the worktime of the composition and the faster, more complete will be the cure. Solvents and any acidity present in added ingredients such as the aggregate may alter the catalytic activity. In general, however, catalyst concentrations of at least 2.0 percent by weight of the phenolic resin, preferably from 2.5 to 15 percent by weight, are used.

With this information, however, those skilled in the art will be able to select the type and amount of catalyst needed for their particular task once the desired worktime and use conditions are established.

Other optional ingredients may be used in the polyurethane forming binder material such as silanes.

Silanes which are useful include those having the general formula:

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.1% to 2%, based on the total weight of the phenolic resin component and isocyanate component, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (Ureido-silane).

The polyurethane binder materials are prepared by adding the catalyst to the phenolic resin component followed by the addition of the isocyanate component. This mixture is then added to the aggregate to form a workable composite which is used for filling space in roadways, runways, and other structures made with asphalt, concrete, cement, and other such building materials. The binders are particularly useful when percolated into the wet, coarse aggregate which is filling the space.

EXAMPLES

The examples which follow will illustrate specific embodiments of the invention. These examples along with the written description will enable one skilled in the art to practice the invention. In particular, various catalyst levels will be shown for different uses and environmental conditions. It is contemplated that many other embodiments of the invention will be operable besides these specifically disclosed.

In these examples two phenolic base resins were used described as follows:

BR-1 = a phenolic resole benzylic ether prepared by reacting paraformaldehyde with phenol in a mole ratio of paraformaldehyde to phenol of approximately 1.6 to 1 in the presence of 0.24 weight percent (based upon the weight of the total charge) of Lead CemAll (24% active) sold by Mooney Chemicals, Inc.

BR-2 = an alkoxy modified phenolic resole benzylic ether prepared by reacting paraformaldehyde with phenol in a mole ratio of paraformaldehyde to phenol of approximately 1.3 to 1 in the presence of approximately 2.0 weight percent of methanol and 0.06 weight percent of $Zn(C_2H_3O_2)_2 \cdot 2H_2O$, said weight percent being based upon the weight of the total charge.

With the two base resins, BR-1 and BR-2, five phenolic resin components were prepared by mixing the specified base resins with the specified solvents:

| Component | Parts |
|---|---|
| PRC-1 | |
| BR-1 | 60 |
| BCA[1] | 18 |
| HS-10[2] | 22 |

The viscosity of PRC-1 is 130 cps and the flashpoint is 52° C.

| Component | Parts |
|---|---|
| PRC-2 | |
| BR-1 | 50 |
| BCA | 28 |
| HS-15[2] | 22 |

The viscosity of PRC-2 is 70 cps and the flashpoint is 69° C.

| Component | Parts |
|---|---|
| PRC-3 | |
| BR-1 | 50 |
| BCA | 22.5 |
| HS-15 | 27.5 |

The viscosity of PRC-3 is 80 cps and the flashpoint is 69° C.

| Component | Parts |
|---|---|
| PRC-4 | |
| BR-2 | 50 |
| DBE[3] | 21.875 |
| HS-15 | 28.125 |

The viscosity of PRC-4 is 61 cps and the flashpoint is 68° C.

| Component | Parts |
|---|---|
| PRC-5 | |
| BR-2 | 46.48 |
| DBE | 20.34 |
| HS-15 | 26.15 |
| PG[4] | 7.03 |

The viscosity of PRC-5 was 58 cps and the flashpoint was 68° C.

[1] BCA is butyl cellulose acetate.
[2] HISOL 10 and 15 are hydrophobic aromatic solvents sold by Ashland Chemical Company.
[3] DBE is dibasic ester which functions as a hydrophobic solvent.
[4] PG is propylene glycol which functions as a chain extender.

Two isocyanate components were prepared by mixing MONDUR MR, an oligomeric diphenylmethane diisocyanate (hereinafter referred to as CMDI or crude MDI) sold by Mobay Chemical Company, with the specified solvents:

| Component | Parts |
|---|---|
| IC-1 | |
| CMDI | 73 |
| HS-10 | 27 |
| IC-2 | |
| CMDI | 73 |

-continued

| Component | Parts |
|---|---|
| HS-15 | 27 |

The catalyst (C) used in the examples was 4-phenylpropyl pyridine either as a concentrate or as a dilute mixture consisting of 4-phenylpropyl pyridine and HS-10.

In Examples 1-6, several polyurethane composites were prepared by mixing a polyurethane-forming binder system into a wet, coarse aggregate. In these examples, the catalyst was first mixed with the phenolic resin component. Thereafter, the isocyanate component was mixed with the phenolic resin component. This binder system was then added to the aggregate.

These examples show that the subject polyurethane-forming binder systems can be used with wet, coarse aggregate to form a composite with strength properties that make them effective in repairing roads, runways, and other structures made from asphalt, concrete, cement and other such building materials.

The specific formulations used in the examples along with the resulting properties are disclosed:

EXAMPLE 1

Formulation

| Component | pbw |
|---|---|
| PRC-2 | 30 |
| IC-1 | 22.5 |
| C | 0.38 (2.5% based on BR-1) |

Observations

The binder system was poured into water. It gelled in 3 minutes 8 seconds and had a good appearance.

EXAMPLE 2

Formulation

| Component | pbw |
|---|---|
| PRC-3 | 107.8 |
| IC-2 | 80.9 |
| C | 1.36 (2.5% based on BR-1) |

Observations

The binder cured effectively in water. It also cured in wet pea gravel and made a composite in 2" cubes having an average compressive strength of 3044 psi.

EXAMPLE 3

Formulation

| Component | pbw |
|---|---|
| PRC-4 | 30 |
| IC-2 | 23.4 |
| C | 0.8 (5.7% based on BR-2) |

Observations

Poured binder system into water. It cured without foaming.

EXAMPLE 4

Formulation

| Component | pbw |
|---|---|
| PRC-4 | 30 |
| PG | 2 |
| IC-2 | 32.4 |
| C | 0.75 (5.4% based on BR-2) |

Observations

Nearly equal volumes of the phenolic resin component and isocyanate were used in this experiment. The system cured in water without foaming.

EXAMPLE 5

Formulation

| Component | pbw |
|---|---|
| PRC-5 | 106.49 |
| IC-2 | 111.11 |
| C | 2.31 (4.7% based on BR-2) |

Observations

The binder was poured into wet pea gravel in 2" cubes. The average compression strength was 3,578 psi. The volume of the phenolic resin component and isocyanate component used in this experiment were equal.

Having thus described our invention, what we claim as new and desired to secure by Letters Patent is:

1. A process for filling space in a structure with a polyurethane composite having a compressive strength of at least 2,000 p.s.i. which comprises
    (a) adding a wet, coarse aggregate to said space of said structure, and
    (b) adding a polyurethane binder to said aggregate wherein said binder comprises a mixture of
        i. a phenolic resin component, which is denser than water, comprising
            1. a phenolic resole resin, and
            2. a hydrophobic solvent system in which water is not significantly soluble;
        ii. an isocyanate component which is denser than water comprising
            1. an aromatic polyisocyanate selected from the group consisting of diphenylmethane diisocyanates, oligomeric derivatives of diphenylmethane diisocyanates, and mixtures thereof, and
            2. a hydrophobic solvent in which water is not significantly soluble;
        iii. a liquid urethane promoting catalyst; wherein the amounts of said components are as follows:
            1. the weight ratio of the binder to the aggregate is from about 8:92 to about 50:50;
            2. the isocyanate is used in an amount sufficient to cause the curing of the phenolic resin when reacted in the presence of the curing catalyst;
            3. the urethane catalyst is used in an amount such that the binder is essentially nonfoaming and the composite is capable of being formed with wet aggregate; and
    wherein said process is carried out under conditions such that water is present in an amount of at least one percent by weight based upon the weight of said aggregate.

2. The process of claim 1 wherein
(a) the ratio of hydroxyl groups in the phenolic resin component to isocyanato groups in the isocyanate component is from about 0.8:1 to about 1.2:1; and
(b) the urethane catalyst is used in an amount of from about 2.0 weight percent to about 15 weight percent based upon the weight of the phenolic resin component.

3. The process of claim 2 wherein the urethane catalyst is a tertiary amine catalyst which has been added to the phenolic resin component prior to the addition of the isocyanate component to the phenolic resin component.

4. The process of claim 3 wherein the phenolic resin is a benzylic ether resin having a preponderance of bridges joining the phenolic nuclei of the polymer which are ortho-ortho benzylic ether bridges.

5. The process of claim 4 wherein the phenolic resin is an alkoxy modified phenolic resin.

6. The process of claim 5 wherein the solvent system of the phenolic resin comprises an aromatic solvent and polar solvent mixture.

7. The process of claim 6 wherein the flashpoint of the phenolic resin component is greater than 50° C.

8. The process of claim 7 wherein the isocyanate is crude polymethylene polyphenylene polyisocyanate.

9. The process of claim 8 wherein a chain extender or crosslinking compound is added to the phenolic resin component in amounts such that equal volumes of the phenolic resin component and isocyanate component can be used.

10. The process of claim 9 wherein the tertiary amine catalyst is 4-phenylpropyl pyridine.

11. The process of claim 10 wherein excessive water is present, an excessive amount being an amount of at least five percent by weight based upon the weight of the aggregate.

* * * * *